United States Patent
Cluff et al.

(10) Patent No.: US 11,904,426 B2
(45) Date of Patent: Feb. 20, 2024

(54) NON-CONTACT TOOL MEASUREMENT APPARATUS

(71) Applicant: RENISHAW PLC, Wotton-under-Edge (GB)

(72) Inventors: Julian Alexander Cluff, Chipping Sodbury (GB); Graham Richard Ferguson, Stroud (GB); Harry Alan Leafe, Bath (GB); William Ernest Lee, Nailsworth (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 17/975,254

(22) Filed: Oct. 27, 2022

(65) Prior Publication Data

US 2023/0046452 A1    Feb. 16, 2023

Related U.S. Application Data

(63) Continuation of application No. 17/274,728, filed as application No. PCT/GB2019/052826 on Oct. 7, 2019, now Pat. No. 11,511,384.

(30) Foreign Application Priority Data

Oct. 9, 2018  (EP) .................................. 18199443

(51) Int. Cl.
  *B23Q 17/24* (2006.01)
  *G01B 11/02* (2006.01)
  *G01V 8/12* (2006.01)

(52) U.S. Cl.
  CPC .......... *B23Q 17/2485* (2013.01); *G01B 11/02* (2013.01); *G01V 8/12* (2013.01)

(58) Field of Classification Search
  CPC .. B23Q 17/2452; B23Q 17/2485; G01V 8/12; G01V 8/20; G01B 11/02
  See application file for complete search history.

(56) References Cited

U.S. PATENT DOCUMENTS 6,496,273 B1    12/2002    Stimpson et al.
6,878,953 B2    4/2005    Stimpson et al.
(Continued)

FOREIGN PATENT DOCUMENTS

CN    105834836 A    8/2016
GB    1379473 A    1/1975
(Continued)

OTHER PUBLICATIONS

Mathew J. Hess & S. Komar Kawatra (1999) Environmental Beneficiation of Machining Wastes—Part I: Material Characterization of Machining Swarf, Journal of the Air & Waste Management Association, 49:2, 207-212, DOI: 0.1080/10473289.1999. 10463783.

(Continued)

*Primary Examiner* — Kevin K Pyo
(74) *Attorney, Agent, or Firm* — Oliff PLC

(57) ABSTRACT

A non-contact tool measurement apparatus is used in a machine tool environment. The apparatus includes a transmitter including a first aperture and a laser for generating light that is emitted from the transmitter through the first aperture towards a tool-sensing region. A receiver includes an optical detector and is arranged to receive light from the tool-sensing region. A processor analyses the light detected by the optical detector to enable the measurement of tools in the tool-sensing region. The laser is capable of generating light having a wavelength of less than 590 nm thereby enabling the size of the first aperture to be reduced resulting (Continued)

Figure 1:
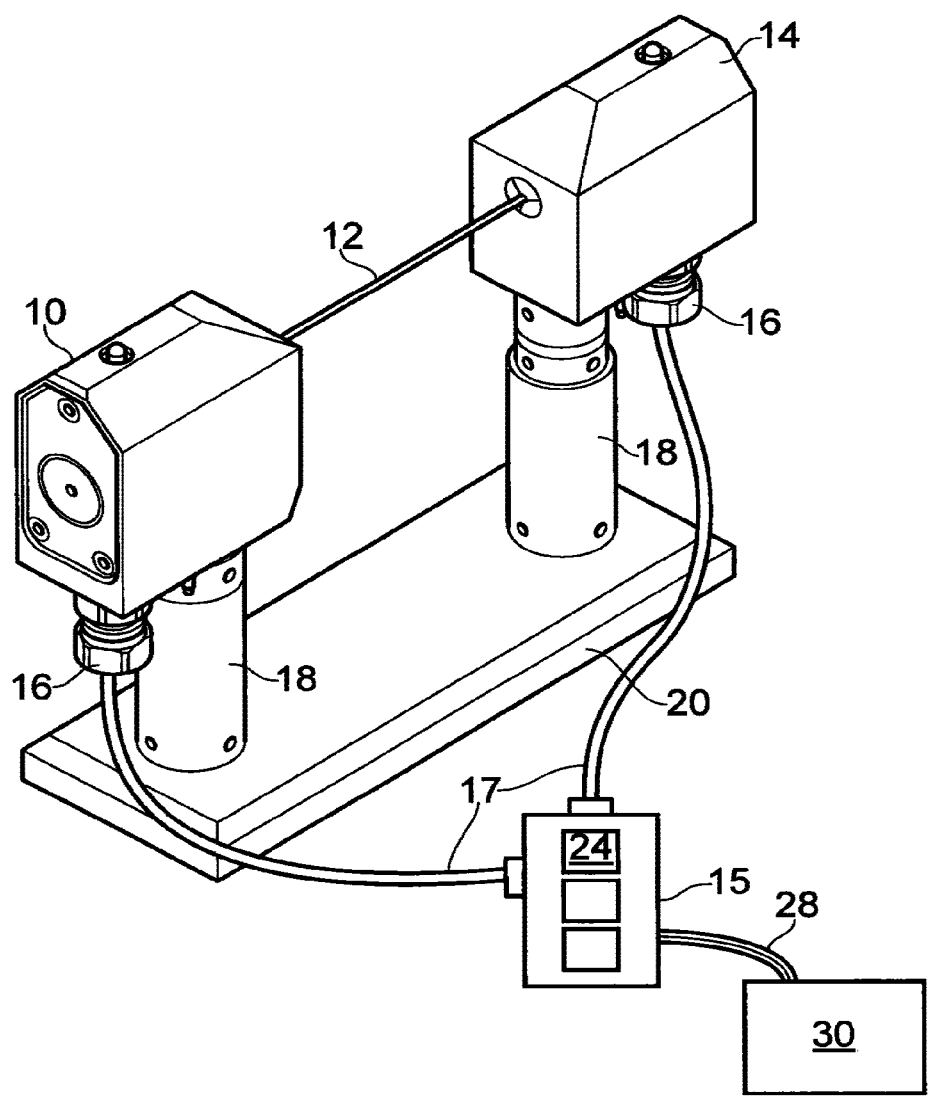

in a reduction in contaminant ingress. In one embodiment, the laser generates blue light.

19 Claims, 2 Drawing Sheets

(56) References Cited

U.S. PATENT DOCUMENTS

| | | |
|---|---|---|
| 7,312,433 B2 | 12/2007 | Stimpson et al. |
| 7,315,018 B2 | 1/2008 | Ashton et al. |
| 8,530,823 B2 | 9/2013 | Egglestone et al. |
| 10,259,091 B2 | 4/2019 | Klugger et al. |
| 2005/0024650 A1 | 2/2005 | Stimpson et al. |
| 2010/0027031 A1 | 2/2010 | Stimpson et al. |
| 2011/0299095 A1 | 12/2011 | Morgan et al. |
| 2014/0268050 A1* | 9/2014 | Jayaraman ............. A61B 3/102 356/479 |
| 2015/0204798 A1 | 7/2015 | Nygaard et al. |

FOREIGN PATENT DOCUMENTS

| | | |
|---|---|---|
| JP | 2000-055628 A | 2/2000 |
| JP | 2007-301649 A | 11/2007 |
| WO | 2019/053432 A1 | 3/2019 |

OTHER PUBLICATIONS

Jan. 25, 2019 Extended Search Report & Written Opinion issued in European Patent Application No. 18199443.5.

Nov. 13, 2019 Search Report issued in International Patent Application No. PCT/GB2019/052826.

Nov. 13, 2019 Written Opinion issued in International Patent Application No. PCT/GB2019/052826.

U.S. Appl. No. 17/274,728, filed Mar. 9, 2021 in the name of Cluff et al.

* cited by examiner

NON-CONTACT TOOL MEASUREMENT APPARATUS

CROSS-REFERENCE TO RELATED APPLICATION(S)

This application is a continuation of U.S. application Ser. No. 17/274,728 filed Mar. 9, 2021, which is based on and claims priority under 35 U.S.C. 119 from European Patent Application No. 18199443.5 filed on Oct. 9, 2018. The contents of the above applications are incorporated herein by reference.

The present invention relates to a non-contact tool measurement apparatus and an associated method of tool measurement. In particular, the present invention relates to an improved break-beam non-contact tool setter for use in a machine tool environment.

Break-beam tool setting devices for use on machine tools are known, for example the NC4 non-contact tool setter is sold by Renishaw plc, Wotton-Under-Edge, UK. Tool setting apparatus of this type includes a transmitter that includes a laser for generating a light beam having a wavelength of around 700 nm. This light beam is directed to a receiver through a region of free space into which a tool can be placed. During a tool setting operation, the machine tool on which the tool setter is mounted is programmed to move a tool into and out of the light beam. Interruption of the light beam by the tool is detected by a detector contained within the receiver module and the apparatus generates a so-called trigger signal whenever the light beam is obscured by a certain amount. This allows the position of a part of a tool (e.g. a tool tip or edge) to be established and can thus be used to measure the length and/or diameter of tools and to monitor tool breakage or wear.

The machine tool environment in which the tool setting apparatus needs to be located is extremely harsh. In addition to swarf and chips of metal generated by cutting operations, it is common for pressurised jets of coolant to be used during cutting processes. For this reason, it is very difficult to keep any transparent optical windows free from damage or contamination. Tool setting apparatus for machines tools, such as the NC4 product mentioned above, therefore transmit and receive light via small apertures through which light can pass unhindered and through which a stream of pressurised air is also ejected to try to keep the apparatus free from the ingress of contaminants. Examples of such arrangements are described in U.S. Pat. Nos. 6,496,273 and 7,312,433.

Although the above described tool setting apparatus typically performs reliably in most situations, the present inventors have found that in some installations there can still be ingress of contaminants through the apertures despite the continual ejection of air.

It is also known to use "on-machine" reflective (i.e. not break-beam) tool detection devices, for example as described in US2010/027031. Such devices are located away from the coolant streams that are present near the machine tool bed and direct light towards tools located in the working volume of the machine tool. For this reason, such devices are much less prone to contamination by coolant etc and can include transparent windows through which light is transmitted and received. Although such devices can detect the presence of tools, they do not provide the measurement capabilities of break-beam tool setting apparatus.

According to a first aspect of the present invention, there is provided a non-contact tool measurement apparatus for a machine tool, comprising;

a transmitter comprising a first aperture and a laser for generating light, the light generated by the laser being emitted from the transmitter through the first aperture towards a tool-sensing region, a receiver comprising an optical detector for detecting received light, the receiver being arranged to receive light from the tool-sensing region, and a processor for analysing the light detected by the optical detector to enable the measurement of tools in the tool-sensing region, the transmitter and receiver being arranged such that the light emitted by the transmitter passes directly to the receiver via the tool-sensing region, a tool located in the tool-sensing region thereby occluding the emitted light, characterised in that the laser is capable of generating light having a wavelength of less than 590 nm.

The present invention thus relates to a break-beam, non-contact tool measurement apparatus for a machine tool. As explained above, any apparatus configured for use in the harsh environment of a machine tool is necessarily quite robust and must be able to withstand the various contaminants (e.g. coolant and cutting debris) to which it will be exposed during its operational lifetime. The apparatus of the present invention comprises a transmitter that includes a laser to generate light and an aperture through which the laser light is emitted. The emitted light passes to a tool-sensing region (i.e. a region in space external to the tool measurement apparatus). A receiver is also provided that includes an optical detector (e.g. a photodiode) for detecting received light. The receiver is arranged to receive light from the tool-sensing region. The light passes from the transmitter to the receiver when no tool is present in the tool sensing region. In particular, the transmitter and receiver are arranged such that the light emitted by the transmitter passes directly to the receiver via the tool-sensing region, a tool located in the tool-sensing region thereby occluding the emitted light. The light detected by the optical detector is analysed by a processor which allows the measurement of tools located in (e.g. moved through) the tool-sensing region. The associated machine tool may thus be programmed to move tools into the tool sensing region, whereupon the processor provides an indication to the machine tool of the presence of the tool (e.g. by issuing a trigger signal). In this manner, tool measurements are performed "on-machine".

The present invention is characterised by the laser of the transmitter generating light having a wavelength of less than 590 nm. As explained below, the laser may have a fixed wavelength output within this wavelength range or it may be tuneable to output light within this wavelength range. The present inventors have found several advantages of using light having a wavelength of less than 590 nm compared with prior art devices in which 700 nm light is used. In particular, the reduction in the laser wavelength allows a smaller beam of light to be generated, which in turn enables the size of the first aperture through which the light is emitted from the transmitter to be reduced. This smaller aperture reduces the ingress of contaminants thereby improving the ability of the apparatus to withstand the harsh conditions within the machine tool environment. As explained in more detail below, the resistance to such contaminants is increased by a factor of more than 1.25 when using light having a wavelength of 590 nm compared to using 700 nm light. In this manner, a more robust and reliable tool setting apparatus is provided.

The transmitter preferably emits a beam of light. The beam of light is preferably substantially non-divergent. The laser may inherently emit such a light beam. Advantageously, the transmitter comprises one or more optical elements (e.g. lenses, optical apertures, attenuators and/or other elements) that act on the light generated by the laser to form a light beam that is emitted from the transmitter through the first aperture. The light beam may have any cross-sectional profile; e.g. it may have a substantially circular or elliptical cross-section.

The light beam may be substantially collimated, which may include a light beam that is slightly divergent. Advantageously, the one or more optical elements are configured such that the light beam converges to a focus within the tool-sensing region. The use of a focused light beam has the advantage that the beam size in the tool sensing region can be made as small as possible to allow the measurement of smaller tools. However, such a tightly focused system has the disadvantage of requiring more accurate alignment of the various optical components. If a substantially collimated light beam is used, the optical alignment tolerances are eased but the accuracy of the measurement of, in particular, small tools can be degraded.

As outlined above, an advantage of using a shorter wavelength of light is the ability to reduce the beam size and thereby reduce the size of the aperture through which the light beam exits the transmitter. Advantageously, the first aperture is dimensioned to be the smallest size through which the light beam can pass. In other words, the aperture is appropriately shaped and configured to be as small as possible without substantially attenuating the light beam.

The tool setting apparatus may include an air-bleed function in which air (or any other gas) is ejected from the first aperture in the transmitter. The transmitter is thus preferably configured to emit pressurised gas (i.e. as well as the light beam) through the first aperture. As explained above, this gas flow helps to prevent the ingress of contaminants. The use of light having a shorter wavelength reduces the smallest permissible size of the first aperture thereby decreasing the amount of gas required to maintain the same velocity of gas expulsion from the first aperture.

The receiver may, like the transmitter, also comprise an aperture through which light passes to the optical detector. In other words, the receiver preferably comprises a second aperture through which received light passes to the optical detector. The receiver is preferably configured to emit pressurised gas through the second aperture. In common with the above described first aperture of the transmitter, the second aperture can be smaller when shorter wavelengths of light are used. A similar reduction in air consumption can thus be attained for the receiver.

The laser could be a fixed wavelength laser. The laser may be of any type. For the avoidance of doubt, the term "laser" as used herein should be understood to include laser diodes. Advantageously, the laser may be a diode laser (which is advantageous from a size perspective). The laser may comprise a Gallium Nitride (GaN) laser diode. The laser could include frequency adjusting components (e.g. frequency doublers or the like) to provide the desired wavelength of light. Alternatively, the laser may comprise a wavelength-tuneable laser. The wavelength-tuneable laser is capable of being tuned to generate light having a wavelength of less than 590 nm. However, it may also be capable of being tuned to output light having a longer wavelength. For example, it may be able to be adjusted to generate light having a wavelength of 700 nm for backward compatibility reasons. In this manner, the wavelength may be adjusted as required.

The aperture size may also be adjusted accordingly (e.g. by adapting or replacing the first and/or second apertures) when using different wavelengths of light.

Preferably, the laser is capable of generating light having a wavelength of less than 550 nm. More preferably, the laser is capable of generating light having a wavelength of less than 500 nm. More preferably, the laser is capable of generating light having a wavelength of less than 450 nm. More preferably, the laser is capable of generating light having a wavelength of less than 420 nm. The laser may conveniently be capable of generating light having a wavelength of around 400 nm. The laser may output light in the green or blue parts of the spectrum. The laser may output light in the blue part of the spectrum. The laser may output light in the ultraviolet (UV) part of the spectrum. The laser light may be visible to a human. The laser light may have a wavelength shorter than that visible to a human. As explained below, the shorter the wavelength the greater the resistance to contaminants and the less gas (air) required (i.e. if an air-bleed arrangement is implemented). Conveniently, the wavelength is at least 400 nm (i.e. 400 nm or greater). Providing a wavelength of 400 nm or more is preferable for laser safety reasons. In particular, lasers emitting light having a wavelength of 400 nm or more are typically allowed to operate at higher output powers than shorter wavelength lasers whilst not exceeding "class 2" status (as defined in the BSI Standards Publication BS EN 60825-1: 2014 "Safety of Laser products").

The transmitter may include a single laser. Alternatively, a plurality of lasers may be provided. If a plurality of lasers is provided, the lasers may output light of different wavelengths. The optical detector may be configured to sense, or receive, light from only one of the plurality of lasers (e.g. optical filters or the like may be used so that the beam intensity signal relates to light received from one laser). In a preferred embodiment, the (primary or metrology) laser of the transmitter may be used for tool measurement as described above. This primary laser may operate at a short wavelength (e.g. 400 nm) to provide optimum measurement performance.

The transmitter may comprise an additional targeting or pointing light source (e.g. an LED, white light source or additional lasers as mentioned above) for generating additional light. The additional light source may be a monochromatic light source. This additional light may have a wavelength in the visible wavelength band (e.g. red or green light to which the eye is most sensitive) and/or have a wavelength that is different to the wavelength of the laser. The additional light may exit the transmitter through the laser aperture (i.e. the same aperture through which the light from the laser is emitted) or a separate aperture could be provided in the transmitter for outputting light generated by the light source. Conveniently, the additional light generated by the light source is substantially coincident with the light generated by the (primary) laser. Advantageously, the light beam generated by the laser overlaps with the light from the light source. In this manner, there is improved visibility to a user of the path of the light emitted by the transmitter. This improved visibility of the light path may help manual verification of correct tool setting operations.

The processor is configured to analyse the light intensity detected by the optical detector. For example, the optical detector may generate a beam intensity signal that is passed to the processor. The optical detector may comprise a photodiode. The optical detector comprises a photodiode having a single photosensitive area. The optical detector may include a plurality of sensing elements. The optical detector may comprise a sensor array. For example, the optical sensor may comprise a 2D sensor array (such as a CCD). The processor may perform any suitable analysis on the output of the optical detector. This analysis may include image analysis. Preferably, the processor is arranged to monitor the light intensity detected by the optical detector and issue a trigger signal when the detected light intensity crosses a predetermined threshold. The machine tool may then use the trigger signal to measure desired tool features; such measurements being known in the art and thus not explained in any more detail here. In one embodiment, the apparatus could be a tool setter device as described in our international patent application PCT/GB2018/052600.

The transmitter and receiver are arranged in a transmissive or "break-beam" configuration. In particular, the light emitted by the transmitter passes directly to the receiver via the tool-sensing region. A tool located in the tool-sensing region will thereby occlude the emitted light. This light occlusion is monitored to allow tool measurements. This transmission mode is particularly suited to tool setting (i.e. measuring tool dimensions, such as length etc) and tool breakage detection.

The tool measurement apparatus may be a tool setting and/or tool analysis apparatus. The apparatus may include a transmitter and a receiver that are separately mounted to parts of a machine tool. In this case, the transmitter and receiver are aligned with each other during installation. Advantageously, the transmitter and receiver are formed as part of an integral unit. For example, the transmitter and receiver of the apparatus may both be attached to a common base that can be mounted to a machine tool. In this manner, alignment of the transmitter and receiver can be done during manufacture. The processor may be integrated into the transmitter and/or the receiver and/or any common base or it may be provided as a separate unit.

According to a second aspect of the present invention, there is provided a method of making tool measurements on a machine tool, the method comprising the steps of; (i) using a laser to pass a beam of light through a tool-sensing region within a machine tool working envelope, (ii) using an optical detector to receive light from the tool sensing region, the beam of light from the laser passing directly to the optical detector via the tool-sensing region, and (iii) monitoring the light detected by the optical detector to measure a tool located in the beam of light, characterised by the beam of light having a wavelength of less than 590 nm. The method may comprise use of any of the features or properties of the corresponding apparatus that is described above.

Also described herein is a non-contact tool measuring apparatus for a machine tool, comprising a transmitter for generating and emitting light, wherein the transmitter comprises a wavelength-tuneable laser. The apparatus may also include any one or more of the features, alone or combination, that are also described herein.

Figure 2:
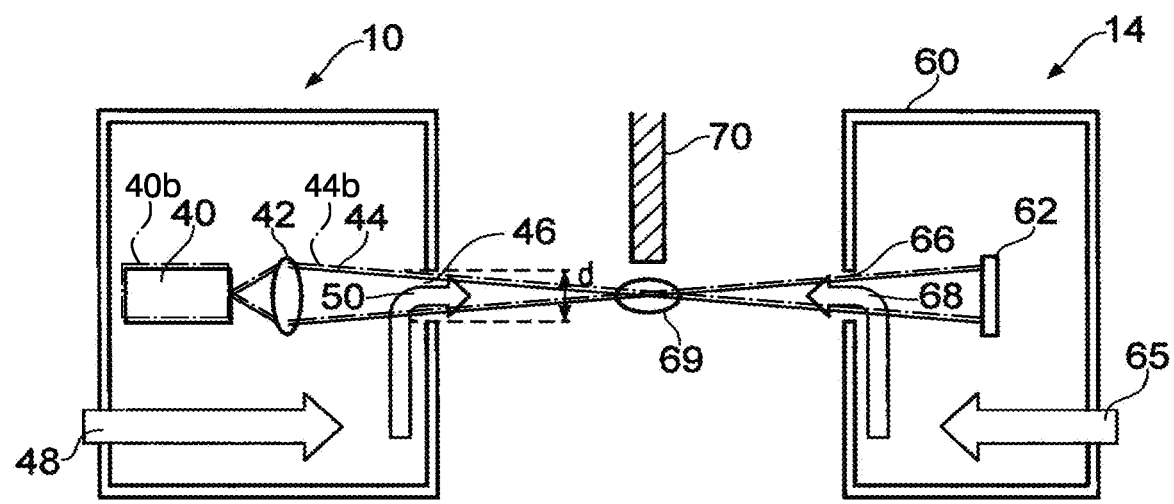

Also described herein is a non-contact tool measuring apparatus for a machine tool, comprising a transmitter having a first laser 40 for generating a first beam of light 44, wherein the apparatus further comprises a second light source 40b (e.g. a second laser) for generating a second beam of light 44b that has a different wavelength to the first beam of light (shown in FIG. 2 in dash-dot-dash as an alternative light source overlapping the first). The first and second light beams may be arranged to coincide (although not shown in detail, one of ordinary skill in the art would understand how to arrange the light sources so that the first and second light beams are arranged to coincide). The first light beam may have a wavelength of less than 590 nm (e.g. it may be blue light). The second light beam may have a more readily visible wavelength (e.g. it may be red or green). The apparatus may also include any one or more of the features, alone or combination, that are also described herein.

Also described herein is a non-contact tool measurement apparatus for a machine tool. The apparatus may comprise a transmitter. The transmitter may comprise a first aperture. The transmitter may comprise a laser for generating light. The light generated by the laser may be emitted from the transmitter through the first aperture towards a tool-sensing region. A receiver may be provided. The receiver may comprise an optical detector for detecting received light. The receiver may be arranged to receive light from the tool-sensing region. A processor may also be provided. The processor may be for analysing the light detected by the optical detector. This may enable the measurement of tools in the tool-sensing region. The laser may be capable of generating, or configured to generate, light having a wavelength of less than 590 nm. The light may pass from the transmitter to the receiver when no tool is present in the tool sensing region (i.e. in a break-beam configuration). Alternatively, light reflected from a tool located in the tool-sensing region may be received by the receiver. For example, the apparatus may comprise a transmitter and receiver arranged in a reflective configuration. In this configuration, none of the light emitted by the transmitter is received by the detector in the absence of an object being located in the tool-sensing region. However, light reflected from a tool located in the tool-sensing region is received by the receiver. This reflective mode is particularly suited to checking the presence and properties of a tool. The apparatus may also include any one or more of the features, alone or combination, that are also described herein.

Figure 3:
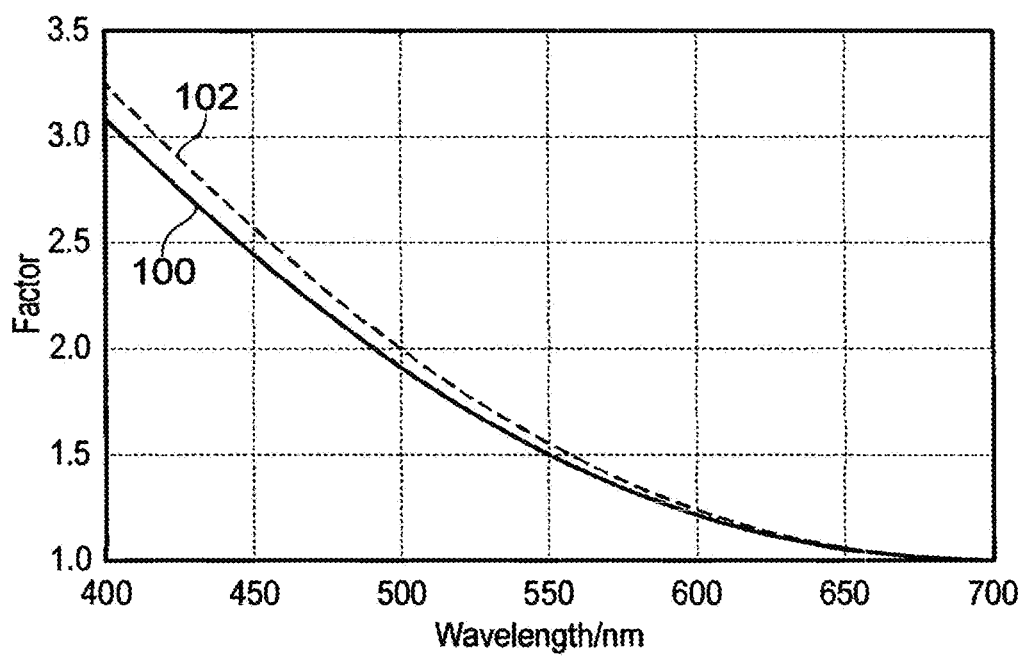

The invention will now be described, by way of example only, with reference to the accompanying drawings in which;

FIG. 1 illustrates a non-contact tool setter apparatus that is mountable to a machine tool, FIG. 2 shows the transmitter and receiver arrangement of the non-contact tool setter apparatus of FIG. 1 in more detail, and FIG. 3 shows the reduction in contaminant ingress and air consumption that can be achieved using shorter wavelength laser sources.

Referring to FIG. 1, a schematic illustration of tool setting apparatus of the present invention is provided. The apparatus comprises a transmitter 10 for generating a beam of light 12 having a wavelength of 400 nm (i.e. the light beam comprises blue light). The transmitter 10 generates the light beam 12 using a laser diode and suitable optics; these are not shown in FIG. 1 but are described in more detail below with reference to FIG. 2. A receiver 14 is also illustrated for receiving the beam of light 12. The receiver comprises a photodiode (not shown) for detecting the beam of light 12.

The transmitter 10 and receiver 14 are both affixed to a common base 20 by pillars 18. This arrangement ensures the transmitter 10 and receiver 14 maintain a fixed spacing and orientation relative to one another. The base 20 may then be mounted directly to the bed, or indeed any appropriate part, of a machine tool. It should also be noted that various alternative structures for mounting the transmitter and receiver could be used. For example, a common housing for the transmitter and receiver could be provided or discrete transmitter and receiver units could be separately mounted to the machine tool.

The apparatus also comprises an interface 15 connected to the transmitter 10 and receiver 14 via electrical cables 17. The interface 15 provides electrical power to the transmitter 10 and receiver 14 and also receives a beam intensity signal from the photodiode detector of the receiver 14. The interface 15 also comprises a processor 24 that analyses the beam intensity signal and generates a trigger signal whenever a trigger threshold (e.g. 50%) is crossed. This trigger signal is passed to the SKIP input of a controller 30 of an associated machine tool via cable 28. In use, a tool moved into the beam by the associated machine tool causes the beam intensity signal to drop. A trigger signal is issued to the machine tool when the beam intensity signal crosses the trigger threshold and the position of tool as measured by the machine tool is captured on receipt of the trigger signal. In this manner, the position of the tool can be determined thereby allowing tool size (e.g. tool length or diameter) to be established. Further details about how the beam intensity signal can be processed to establish the presence of a tool is described in, for example, U.S. Pat. Nos. 6,878,953 and 7,315,018.

Referring next to FIG. 2, the internal configuration of the transmitter 10 and receiver 14 is illustrated in more detail.

The transmitter 10 comprises transmitter housing 38 that contains a laser diode 40 and focusing optics 42. The laser diode 40 of the present embodiment is a 1 mW (laser class 2) Gallium Nitride (GaN) laser diode that emits radiation having a wavelength of around 400 nm. The light generated by the laser diode 40 is focused into a light beam 44 by the focusing optics 42 and exits the transmitter 10 via an aperture 46 formed in the transmitter housing 38. Although not shown, other optical components may also be included as necessary (e.g. optical apertures for clipping or shaping the laser beam, optical filters, beam attenuators etc). The light beam 44 has a substantially circular cross-sectional profile and the aperture 46 has a similar cross-sectional profile and is appropriately dimensioned (i.e. having diameter d) to be slightly larger than the light beam 44. In this manner, the light beam 44 can exit the aperture 46 without being substantially attenuated. A supply of pressurised air (indicated by arrow 48) is fed into the internal cavity of the transmitter housing 38 and is expelled through the aperture 46 (as indicated by arrow 50). This air bleed is intended to try to prevent as much cutting debris, coolant etc as possible from entering the transmitter housing.

The receiver 14 comprises a receiver housing 60 that includes a photodiode 62. Light entering the receiver housing 60 through an aperture 66 falls on the photodiode 62. The photodiode 62 is configured to be sensitive to light having a wavelength of 400 nm. Although not shown, appropriate wavelength filters may also be included to prevent light of wavelengths other than 400 nm from reaching the photodiode 62. A supply of pressurised air (indicated by arrow 65) is fed into the internal cavity of the receiver housing 60 and is expelled through the aperture 66 (as indicated by arrow 68). As above, this air bleed is intended to try to prevent as much cutting debris, coolant etc as possible from entering the receiver housing.

The transmitter 10 and receiver 14 are positioned relative to one another such that the light beam 44 emitted from the transmitter 10 passes to the receiver 14. The aperture 66 of the receiver housing 60 is sized to be as small as possible whilst still allowing the light beam to pass therethrough. A region of free space is provided between the transmitter 10 and receiver 14 through which the light beam passes. The light beam 44 is brought to a focus in a tool sensing region 69. In use, the tip of a tool 70 moved down into the tool sensing region 69; this will occlude the light beam and a trigger signal is issued thereby allowing the length of the tool 70 to be measured. The beam diameter is smallest within the tool sensing region 69 and thereby allows the most accurate measurement of tool size.

As explained above, prior art tool setting apparatus includes lasers that emit red light, typically with a wavelength of 700 nm. The use of shorter wavelength light, such as the 400 nm light of the present embodiment, offers a number of advantages. In particular, the shorter wavelength (blue) light can be focused to a smaller spot that a longer wavelength (red) light which enables tool dimensions to be measured with greater accuracy. Importantly, the use of shorter wavelength (e.g. blue) light also enables a smaller aperture to be formed in the transmitter and/or receiver housings because the light beam can have a smaller cross-section for a given focal spot size. The use of a smaller aperture not only reduces the consumption of air that is required to maintain expulsion of air at a certain velocity through the aperture but also reduces the ingress of contaminants (coolant, chips, swarf, dirt etc) into the apparatus via that aperture. Furthermore, the use of blue light in combination with the smaller aperture also reduces the amount of stray light that contributes to the noise of the beam intensity signal.

Referring to FIG. 3, the effect of using different wavelengths of light on contaminant ingress and air consumption are illustrated. In particular, the horizontal axis of FIG. 3 shows the wavelength of light whilst the vertical axis shows a reduction factor. As explained above, reducing the wavelength reduces the minimum optical beam size that can be obtained and hence reduces the size of the aperture through which the optical beam passes. The line 100 shows the factor by which air consumption is reduced as the wavelength is reduced from 700 nm (the factor being defined as unity for 700 nm). This assumes the volumetric flux (i.e. the amount of air ejected per square millimetre of the aperture) remains constant. The line 102 shows the reduction in particle ingress as a function of wavelength; this reduction in particle ingress results from the reduced area of the aperture (i.e. reducing the size of the opening through which contaminants can pass) and also by taking account of the size distribution of particles generated during a typical cutting process (i.e. the aperture blocks particles above the aperture size from entering).

It can be seen from FIG. 3 that using a wavelength of about 590 nm instead of 700 nm means there is 1.25 times less particle ingress and a similar reduction in air consumption. Reducing the wavelength further to around 550 nm reduces particle ingress by a factor of 1.5, with a slightly smaller reduction in air consumption. The use of a wavelength of 500 nm results a reduction factor of 2 (i.e. half as much particle ingress) whereas at a wavelength of 400 mm the reduction is by more than a factor of 3. These figures were based on the assumption that a 0.45 mm aperture was required for light having a wavelength of 700 nm and the finding that this can be halved to a 0.25 mm aperture when using a wavelength of 400 nm.

The distribution of particle sizes used in this analysis were taken from the paper Mathew J. Hess & S. Komar Kawatra (1999) Environmental Beneficiation of Machining Wastes—Part I: Material Characterization of Machining Swarf, Journal of the Air & Waste Management Association, 49:2, 207-212, DOI: 0.1080/10473289.1999.10463783.

The above embodiments thus highlight the advantages of using a tool setting apparatus operating using light having a wavelength shorter than 700 nm. It should again be remembered that these are merely examples and other embodiments would be possible. For example, the laser diode may be a wavelength tuneable laser (e.g. the laser diode may be adjustable to emit light having a wavelength within the range of 400 nm to 670 nm or within any of the wavelength ranges described herein). In this manner, the apparatus may be configurable to use different wavelengths of light for different applications. Although a single laser is described, it would also be possible to have a transmitter that comprises a plurality of lasers. These lasers could be of different wavelengths. For example, the apparatus could include a blue laser (e.g. having a wavelength of 400 nm or less) and a red laser (e.g. 700 nm). In this manner, measurement could be made using different wavelengths of light. Alternatively, one laser (e.g. a blue laser) could be used for measurement purposes whilst a laser having a different wavelength (e.g. a green or red laser) could provide a more visible beam of light for an operator. In this example, the light beams emitted by the different lasers could be arranged to substantially coincide. Any suitable monochromatic light source may be used instead of a laser. Furthermore, although simple apertures are illustrated above, the apertures could include angled air holes so that air is ejected in a direction that does not coincide with the optical path of the light beam (e.g. as per U.S. Pat. No. 6,496,273). The skilled person would also be aware, on reading the present specification, of the variants to the above embodiments that would be possible.

The invention claimed is:

1. A non-contact tool measurement apparatus for a machine tool, comprising;
    a transmitter comprising a first aperture and a first laser for generating a first light beam, the first light beam being emitted from the transmitter through the first aperture towards a tool-sensing region,
        a receiver comprising a second aperture and an optical detector for detecting received light, the receiver being arranged to receive the first light beam from the tool-sensing region, the received first light beam passing to the optical detector through the second aperture, and
        the transmitter and receiver being arranged such that the first light beam emitted by the transmitter passes to the receiver via the tool-sensing region, a tool located in the tool-sensing region thereby occluding the emitted first light beam and the first light beam passing from the transmitter to the receiver when no tool is present in the tool sensing region,
        wherein the transmitter comprises a second light source for generating a second light beam having a wavelength that is different to the wavelength of the first light beam, and
    wherein the transmitter is configured so that the second light beam is substantially coincident with the first light beam.

2. An apparatus according to claim 1, wherein the second light source is capable of generating light in the visible wavelength band.

3. An apparatus according to claim 1, wherein the second light source comprises a second laser.

4. An apparatus according to claim 1, wherein the first laser is capable of generating light having a wavelength of less than 590 nm.

5. An apparatus according to claim 1, wherein the first laser is capable of generating light having a wavelength of less than 500 nm.

6. An apparatus according to claim 1, wherein the first laser is capable of generating light having a wavelength of less than 420 nm.

7. An apparatus according to claim 1, wherein the first laser is capable of generating ultraviolet light.

8. An apparatus according to claim 1, wherein both the first light beam and the second light beam can be used for tool measurement.

9. An apparatus according to claim 1, wherein the second light beam is more visible to an operator than the first light beam.

10. An apparatus according to claim 1, comprising a processor configured to analyze the light detected by the optical detector to issue a trigger signal indicating a moment at which light passing from the transmitter to the receiver is interrupted or restored.

11. An apparatus according to claim 1, wherein the transmitter is configured to emit pressurized gas through the first aperture and the receiver is configured to emit pressurized gas through the second aperture.

12. A non-contact tool measurement apparatus for a machine tool, comprising;
    a transmitter comprising a first aperture and a laser for generating light, the light generated by the laser being emitted from the transmitter through the first aperture towards a tool-sensing region,
        a receiver comprising a second aperture and an optical detector for detecting received light, the receiver being arranged to receive light from the tool-sensing region, the received light passing to the optical detector through the second aperture, and
        the transmitter and receiver being arranged such that the light emitted by the transmitter passes to the receiver via the tool-sensing region, a tool located in the tool-sensing region thereby occluding the emitted light and light passing from the transmitter to the receiver when no tool is present in the tool sensing region,
        wherein the laser comprises a wavelength-tunable laser.

13. An apparatus according to claim 12, wherein the wavelength-tunable laser is capable of generating light having a wavelength of less than 590 nm.

14. An apparatus according to claim 12, wherein the wavelength-tunable laser is capable of generating light having a wavelength of less than 500 nm.

15. An apparatus according to claim 12, wherein the wavelength-tunable laser is capable of generating light having a wavelength of less than 420 nm.

16. An apparatus according to claim 12, comprising a processor configured to analyze the light detected by the optical detector to issue a trigger signal indicating a moment at which light passing from the transmitter to the receiver is interrupted or restored.

17. An apparatus according to claim 12, wherein the transmitter is configured to emit pressurized gas through the first aperture.

18. An apparatus according to claim 12, wherein the receiver being configured to emit pressurized gas through the second aperture.

19. An apparatus according to claim 12, wherein the transmitter includes one or more optical elements that act on the light generated by the wavelength-tunable laser to form a light beam that is emitted from the transmitter through the first aperture.

* * * * *